United States Patent Office 3,247,759
Patented Apr. 26, 1966

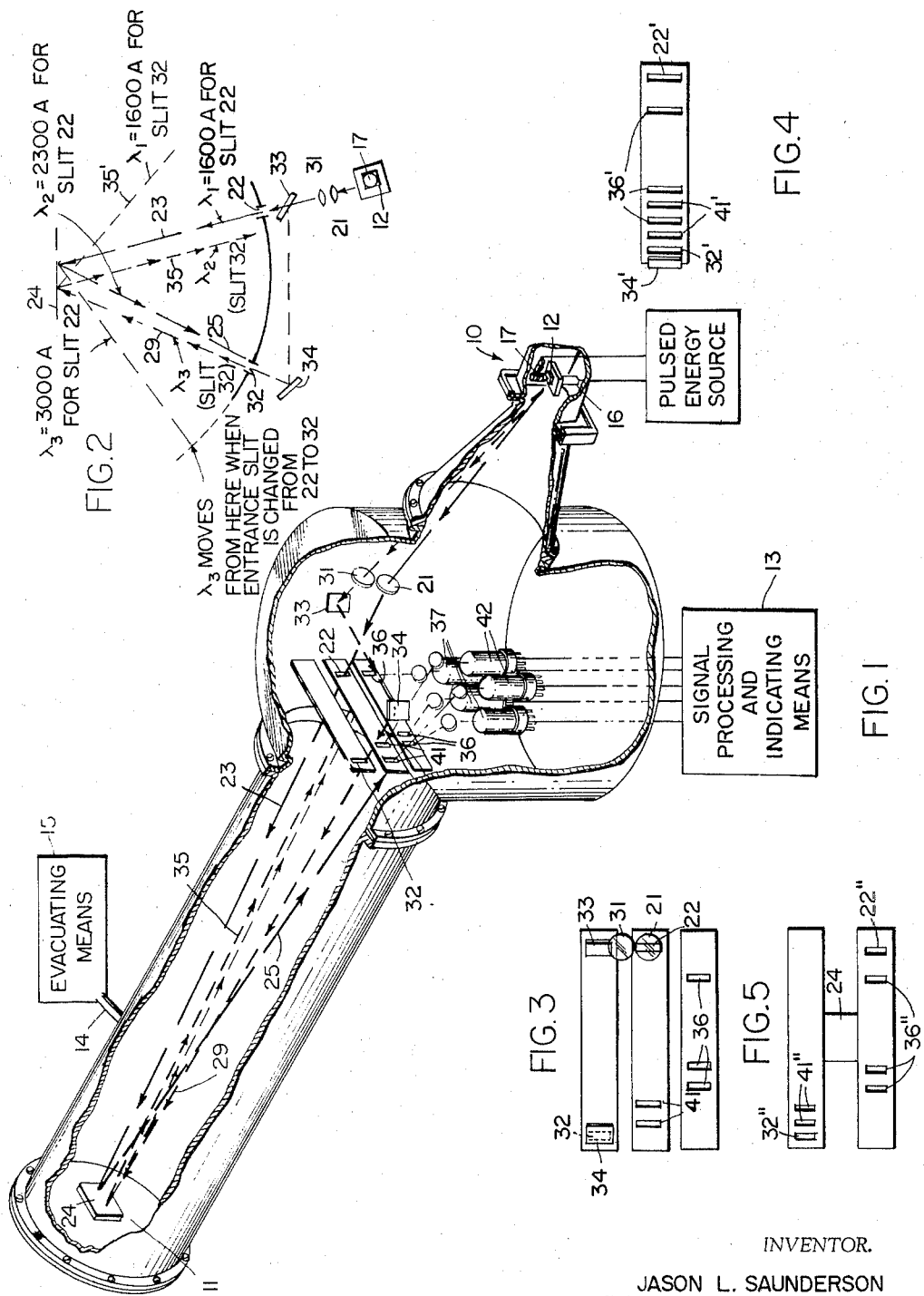

3,247,759
SPECTROMETER WITH MULTIPLE ENTRANCE SLITS
Jason L. Saunderson, Lexington, Mass., assignor, by mesne assignments, to Consolidated Electrodynamics Corporation, Pasadena, Calif., a corporation of California
Filed Mar. 6, 1962, Ser. No. 177,918
9 Claims. (Cl. 88—14)

The present invention relates in general to spectroscopy and more particularly concerns novel methods and means for minimizing the volume embracing the optical paths required for analyzing spectra in a given bandwidth. Application of the inventive concepts to spectrometric apparatus having an evacuated chamber for the radiant energy paths facilitates a considerable reduction in the volume of the evacuated chamber. This reduction in volume in turn results in a requirement for a less costly chamber because the pressure it must withstand is considerably reduced. In addition, the time for evacuating the chamber of smaller volume is reduced with a corresponding increase in the number of measurements which the apparatus can perform in a given time.

The present invention is especially useful in spectrochemical qualitative or quantitative analysis of a substance. This technique is performed by observing the spectrum of the radiant energy emitted by the incandescent vapor of the substance analyzed. The steps in this technique typically include vaporization of a sample of the substance, excitation of the vapor to luminescence, resolution of the resultant radiation into a spectrum, and a determination of the wavelengths of the different line spectra and the intensity of each line.

In most spectrochemical light sources, the same electrical discharge is used to both produce the sample vapor and excite it to luminescence. This may be accomplished, for example, by establishing an electrical arc discharge across the sample. While many samples may be analyzed adequately without requiring an evacuated chamber, certain analyses require that the radiant energy traverse a path in vacuum. Air is opaque to energy of wavelength below 2,000 A. or so because the oxygen absorbs this energy.

The limiting factor in the size of the evacuated chamber has been the arcuate length of the focal surface for resolving the different spectral lines. That is, the arcuate length of the focal surface supporting the exit slits corresponding to spectral lines of interest must have an arcuate length so that exit slits at the extremities of this surface correspond respectively to the longest and shortest wavelenghs of the spectral lines of interest in the spectrum dispersed on the focal surface.

It is an important object of this invention to reduce the volume required to accommodate spectrometric apparatus capable of analyzing spectral lines within a prescribed band of wavelengths. Alternatively, it is an object to maximize the available spectrum capable of being analyzed with apparatus restricted to a specified volume.

It is still a further object of the invention to achieve the preceding objects with but a small increase in system components without sacrificing the ability of the system to provide accurate analysis.

It is a more specific object of the invention to achieve the preceding objects with components disposed in a relatively small evacuated volume relative to the bandwidth capable of being analyzed.

According to the invention, the spectrometer comprises means for dispersing radiant energy, and means defining first and second entrance slits spaced along a focal curve where the images of these slits are focused after dispersion of radiant energy from the means for dispersing, which radiant energy is incident through the entrance slits from a common source. In one form of the invention, the two entrance slits are displaced from one another in a direction generally parallel to their length and respective relatively displaced rows of exit slits are located on the focal surface to produce nonoverlapping dispersed spectra, each row imaging a respective entrance slit. In another form of the invention, the exit slits are between the entrance slits to produce overlapping spectra.

Numerous other features, objects and advantages of the invention will become apparent from the following specification when read in connection with the accompanying drawing, in which:

FIG. 1 shows a combined block-pictorial representation of an exemplary embodiment of the invention;

FIG. 2 is a diagrammatic plan view of a system according to the invention helpful in understanding the mode of operation;

FIG. 3 is a front view of the lens system and slit arrangements of the system of FIG. 1;

FIG. 4 is a front view of the lens system and slit arrangement of a system having overlapping dispersed spectra; and FIG. 5 is a front view of a system having nonoverlapping dispersed spectra with but two rows of slits.

With reference now to the drawing and more particularly FIG. 1 thereof, there is shown a spectrometer according to the invention in which the spectroscopic analysis in the evacuated container 11 of the sample 12 is indicated by the output of signal processing and indicating means 13.

A number of elements of a direct reading spectrometer are shown in the volume bounded by container 11 capable of being evacuated through the tube 14 by the evacuating means 15. The container 11 is shown with portions cut away to illustrate the relationship among the different system components it contains.

A sample 12 is located between a sample support base 16 and an electrode 17 defining an arc discharge gap. An arc discharge across this gap vaporizes a portion of the sample 12 and provides a radiant energy source having a spectral distribution representative of the composition of the sample 12. Some of this radiant energy is focused by the lens 21 upon the lower entrance slit 22 and follows the path 23 to the reflecting diffraction grating 24. Diffraction grating 24 reflects and disperses the incident radiant energy arriving along path 23 into a number of spectral lines, some of which may be embraced within the angle defined by reflected ray 25 and the ray of the incident path 23.

The container 11 is formed with a removable sparking chamber 10 to provide access to the sample-holding base 16. It is to be understood that the sample to be analyzed may be sparked outside the evacuated chamber, and transparent lenses may be lodged in the front end wall of the evacuated chamber for focusing radiant energy excited in the spark gap upon the entrance slits. Placing the sparking electrodes outside the evacuated chamber further reduces the evacuated volume with a resulting increase in attendant advantages discussed above.

Lens 31 focuses other rays of radiant energy from the excited gap upon the upper entrance slit 32 after reflection from a pair of mirrors 33 and 34, respectively. This radiant energy is transmitted through slit 32 along path 29 to diffraction grating 24. Diffraction grating 24 reflects and disperses the energy incident along patch 29 into spectral lines, some of which may be embraced within the angle defined by ray 35 and a ray immediately below the ray of the incident path 29. Lower exit slits 36 transmit dispersed energy corresponding to selected wavelengths to a respective photocell 37. The energy incident upon diffraction grating 24 incident through upper entrance slit 32 will be reflected and dispersed upon reflection into a spectrum below the horizontal plane normal to the plane of grating 24. Grating 24 still functions to provide satisfactory dispersion although both incident and reflected rays following the path between upper entrance slit 32 and lower exit slits 36 are angularly displaced from the horizontal plane.

Upper exit slits 41 transmit dispersed energy coresponding to selected wavelengths to respective ones of photocells 42. Respective lines lead from the photocells outside the evacuated container 11 to the signal processing and indicating means 13, which may be of known type, for processing and indication thereby of the intensity of spectral lines selected by the exit slits.

The principles of the invention will be better understood by referring to FIGS. 2 and 3 showing diagrammatic top and front views, respectively of certain elements of the system shown in FIG. 1. Observe that energy incident through slit 22 is dispersed by diffraction grating 24 into a spectrum bounded by wavelengths $\lambda_1$ and $\lambda_2$ corresponding to 1600 A. and 2300 A., respectively. Energy in the spectrum between 2300 A. and 3000 A. bounded by the wavelengths $\lambda_2$ and $\lambda_3$ is dispersed so that it falls to the left of entrance slit 32 in the sector extending to the broken line representing the $\lambda_3$ line from slip 22. If conventional techniques were employed to examine this spectrum, the array of exit slits 41 would have to be extended to intercept the $\lambda_3$ line with a corresponding increase in the diameter of the chamber required to accommodate the expanded span of exit slits.

By incorporating the additional entrance slit 32 above and to the left of slit 22 as shown best in FIG. 3, the spectral lines having wavelengths between $\lambda_2$ and $\lambda_3$ are observed within substantially the same azimuthal sector as the lines in the band having wavelengths between $\lambda_1$ and $\lambda_2$. This means that an additional band of wavelengths may be resolved without increasing the diameter of the housing surrounding a given span of exit slits.

Referring to FIG. 4, there is shown a front view of a slit defining means according to another aspect of the invention in which the exit slits are positioned between the entrance slits to produce overlapping dispersed spectra and effect a further conservation of space required for the equipment. The spectral band of longer wavelengths overlaps the spectral band of shorter wavelengths. Since, as a practical matter, only predetermined spectral lines are of interest in a given analysis, it is always possible to position respective exit slits coincident with all the spectral lines of interest.

The energy from the sparked source (not shown in FIG. 4) may enter entrance slit 22' directly and follow the path including reflector 34' through entrance slit 32'. Energy incident through entrance slit 22' in one band of wavelengths is dispersed and then exits through exit slits 41'. Energy incident through entrance slit 32' in the other band of wavelengths is dispersed and then exits through exit slits 36'.

Referring to FIG. 5, there is shown a front view of a slit defining means according to still another aspect of the invention in which each entrance slit is imaged upon a row of exit slits in the same row as the other entrance slit. This arrangement embodies means defining a top row of slits including entrance slit 32" beside exit slits 41" and a bottom row of slits including entrance slit 22" beside exit slits 36". It will be observed that the relationship among the rows and diffraction grating 24 results in the top and bottom rows embracing the horizontal plane in which entrance slit 22" and entrance slit 32", respectively, are imaged by diffraction grating 24. As illustrated the top and bottom rows are substantially symmetrical about the horizontal plane perpendicularly bisecting diffraction grating 24. A feature of this aspect of the invention resides in only two rows of slits providing non- overlapping dispersed spectra in a compact structure according to the invention.

There has been described novel methods and means for spectroscopically analyzing radiant energy having spectral components of interest within a maximum bandwidth for a specified volume occupied by apparatus establishing the path of the radiant energy to be analyzed. It is evident that those skilled in the art may now make numerous modifications of and departures from the specific apparatus and techniques described herein without departing from the inventive concepts. Consequently, the invention is to be construed as limited only by the spirit and scope of the appended claims.

What is claimed is:

1. A spectrometer comprising, means defining a substantially fluid-tight chamber having first and second ends for enclosing an atmosphere transparent to radiant energy characterized by spectra within predetermined first and second bands of wavelengths, means within and near the first end of said chamber defining a radiant energy source for exciting a sample to emit radiant energy having spectral components in both said bands, radiant energy dispersion means within said chamber near the second end thereof, means defining first and second entrance slits spaced along a focal curve generally transverse to the length of said chamber where the images of said slits are focused after dispersion of said radiant energy from said dispersion means, means for directing energy from said source through both said entrance slits to said dispersion means to produce first and second dispersed spectra upon a surface within said chamber embracing said focal curve representing images of said first and second slits respectively, means defining exit slits spaced along said focal surface embraced by the angle subtended by said first and second entrance slits and having a vertex at said radiant energy dispersion means for transmitting selected spectral lines in said first and second bands after dispersal by said dispersion means, and transducing means within said chamber responsive to said selected spectral lines of said first and second dispersed spectra transmitted by said exit slits for providing an electrical signal representative of the radiant energy in said selected lines.

2. A spectrometer in accordance with claim 1 wherein said means defining exit slits comprise means defining first and second spaced rows of exit slits, one of said first and second entrance slits being in one of said first and second rows.

3. A spectrometer in accordance with claim 1 wherein said means defining exit slits comprise means defining a row of exit slits, said first and second entrance slits being in said row.

4. A spectrometer in accordance with claim 1 wherein the atmosphere in said chamber is substantially a vacuum.

5. A spectrometer in accordance with claim 1 and further comprising, detachably secured means for establishing access to said exciting means.

6. A spectrometer in accordance with claim 1 wherein said means defining exit slits comprise means defining first and second spaced rows of exit slits, one of said first and second entrance slits being in one of said first and second rows, the other of said entrance slits being in the other of said rows, said rows being generally in alignment in a direction generally perpendicular to the length of each row.

7. A spectroscopic instrument, comprising excitation means for generating radiation from a sample to be analyzed, means defining a focal curve, a single diffraction grating for dispersing the radiation into spectral lines which are focused on the focal curve, and means defining first and second entrance slits disposed between the excitation means and the diffraction grating, the first and second entrance slits being spaced apart whereby radiation from the excitation means passing through the slits is incident upon the diffraction grating at two different angles to produce two bands of spectral lines along the focal curve.

8. A spectroscopic instrument, comprising excitation means for generating radiation from a sample to be analyzed, means defining a focal curve, a diffraction grating for dispersing the radiation into spectral lines which are focused on the focal curve, and means defining first and second entrance slits disposed on the focal curve between the excitation means and the diffraction grating, the first and second entrance slits being spaced apart whereby radiation from the excitation means passing through the slits is incident upon the diffraction grating at two different angles to produce two bands of spectral lines along the focal curve.

9. A spectroscopic instrument in accordance with claim 8 and further comprising means defining an evacuated chamber for enclosing at least the means defining a focal curve and the diffraction grating, means for directing the radiation to the first and second entrance slits, means defining a plurality of exit slits disposed along the focal curve for transmitting selected spectra lines in the two bands, and electric transducer means disposed adjacent the exit slits for receiving the selected spectral lines.

References Cited by the Examiner
UNITED STATES PATENTS

| | | | |
|---|---|---|---|
| 2,453,164 | 11/1948 | Swings | 88—14 |
| 2,837,959 | 6/1958 | Saunderson et al. | 88—14 |
| 2,980,798 | 4/1961 | Romand et al. | 88—14 |

JEWELL H. PEDERSEN, *Primary Examiner.*